(12) United States Patent
Poe et al.

(10) Patent No.: US 6,691,037 B1
(45) Date of Patent: Feb. 10, 2004

(54) LOG PERMEABILITY MODEL CALIBRATION USING RESERVOIR FLUID FLOW MEASUREMENTS

(75) Inventors: Bobby D. Poe, Houston, TX (US); Robert J. Butsch, Tomball, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/317,638

(22) Filed: Dec. 12, 2002

(51) Int. Cl.[7] .................................................. G01V 3/18

(52) U.S. Cl. ......................................... 702/13; 703/10

(58) Field of Search ........................... 702/12, 13, 7, 702/8; 703/10; 73/152.06, 152.18, 152.19, 152.21, 152.22

(56) References Cited

U.S. PATENT DOCUMENTS 6,571,619 B2 * 6/2003 Herron et al. ............ 73/152.14

OTHER PUBLICATIONS

SPE 12113 *Combining Production History and Petrophysical Correlations to Obtain Representative Relative Permeability Data* by Roosevelt Meads and Zaki Bassiouni, no date.
*Calibrating Log–Derived Permeability by Well System Analysis* by Aaron M. Cheng.
*A New Approach to Improved Log–Derived Permeability* by George R. Coates and J.L. Dumanoir.
*The Producibility Answer Product* by George Coates and Stan Denoo.
*Permeability Estimation: The Various Sources and Their Interrelationships* by Usman Ahmed, S.F. Crary and G.R. Coates.
SPE 56658 *Electrofacies Characterization and Permeability Predictions in Carbonate Reservoirs: Role of Multivariate Analysis and Nonparametric Regression* by Sang Heon Lee, Akhil Datta–Gupta, no date.
*Using Log–Derived Values of Water Saturation and Porosity* by R.L.Morris and W.P. Biggs, no date.
*Reservoir Permeability Estimation From Time–Lapse Log Data* by C.Y. Yao and S.A. Holditch.
SPE 24757 *The Profile Permeameter: A New, Fast, Accurate Minipermeameter* by S.C. Jones, no date.
SPE 30581 *Invasion–Based Method for Estimating Permeability From Logs* by M.E. Semmelbeck,, J.T. Dewan and S. A. Holditch, no date.
SPE 35650 *Application of Permlog—A New Log–Based Permeability Estimation Method* by M.E. Semmelbeck and I.R. Diyashev, no date.
SPE 71721 *Imparting Directional Dependence on Log–Derived Permeability* by J.H. Schön and D.T. Georgi and O. Fanini, no date.
SPE 13346 *Reservoir Description Using Well Logs* by Douglas W. Hilchie.

(List continued on next page.)

Primary Examiner—Donald E. McElheny, Jr.
(74) Attorney, Agent, or Firm—Stephen Schlather; Robin Nava (57) ABSTRACT

This invention relates to methods for calibrating a formation permeability model with respect to data obtained from fluid flow measurements. A method according to the invention includes determining a correlation coefficient for a porosity-irreducible water saturation relationship; determining a leading coefficient for a formation permeability model; and determining at least one exponent parameter for the formation permeability model by minimizing a basis function that represents a difference between a formation permeability estimate derived from the formation permeability model and a formation permeability estimate derived from the fluid flow measurements.

16 Claims, 5 Drawing Sheets

OTHER PUBLICATIONS

SPE 17980 *A Field Study and Mapping of Permeability in Gulf of Suez Sandstone Reservoirs* by M.R. Khafagi, no date.

SPE 22297 *Permeability From Logs: A Hypermedia Microcomputer Tutorial* by W.A. Nagel, no date.

*Estimating Production of Prospective New Wells with Log Derived Permeability Feet (Kh Maps* by Alvin L. Schultz.

*A Method for Reconciliation of Log–Derived and Core–Derived Porosity* by P Cooke–Yarborough.

*Average Water Saturation from Capillary Pressure Data* by L. Paul Westbrook and W. John Lee, no date.

*Permeability Averaged Capillary Data: A Supplement to Log Analysis in Field Studies* by A. Johnson.

*Permeability Indication with Conventional Sonic Waveforms* by John P. Castagna, Sandy M. Zucker and Thomas G. Shoberg.

*Determination of In–Situ Permeability from Tube wave Velocity and Attenuation* by D.R. Burns and C.H. Cheng.

*Tube Wave Attenuation and In–Situ Permeability* by Albert T. Hsul, Zhang Jinzhong, C.H.Cheng and M.N.Toksöz.

*Log Derived Permeability and Flushed Zone Saturation Utilizing High Frequency Electromagnetic Wave Attenuation and Propagation Time* by T.D. Scott, Jr. and C.C. Purdy.

\* cited by examiner

LOG PERMEABILITY MODEL CALIBRATION USING RESERVOIR FLUID FLOW MEASUREMENTS

BACKGROUND OF INVENTION

1. Field of the Invention

The present invention relates to the field of well logging. More specifically, the present invention relates to methods for formation permeability estimation.

2. Background Art

Reservoir characterization is important for oil and gas production. Knowledge of formation properties is essential for effective management of the production process. Among all formation properties, permeability (or fluid conductivity) is the most difficult to determine or predict. Permeability is a measure of the ease with which a formation permits a fluid to flow through it.

To be permeable, a rock must have interconnected porosity (pores, vugs, capillaries, fissures or fractures). Greater porosity usually correlates with greater permeability. However, this correlation does not always hold true. For example, a formation of fine-grained sands may have highly interconnected pores. However, these pores and pore channels are too small and the paths available are too restrictive for fluid movement. Therefore, the permeability of a fine grained sand formation may be quite low.

While formation permeability may be directly determined using core plugs in the laboratory or using a formation fluid tester in a wellbore, these measurements are only practical for providing discrete points of permeability values. Therefore, there has been an intense interest in using models to predict formation permeability profiles from other well logging data.

Many investigators have attempted to grasp the complexity of permeability function into a model with general applicability. Most of models developed are empirical models based on correlation between formation permeability, formation porosity and irreducible water saturation. See e.g., Balan, B. et al., "State-Of-The-Art in Permeability Determination From Well Log Data: Part 1—A comparative Study, Model Development," SPE 30978, presented at the SPE Eastern Regional Conference & Exhibition, Morgantown, W.Va., Sep. 21, 1995.

The empirical models typically involve measuring porosity and irreducible water saturation of the core and developing mathematical models relating porosity and irreducible water saturation to permeability. In order to use this approach, it is necessary to obtain effective porosity, which is the portion of the porosity that is not isolated and is connected to the pore network and therefore can contribute to fluid flow, and irreducible water saturation. These parameters are not available directly from well log. Instead, they are estimated from other well log data. However, porosity derived from well log data is not necessarily effective porosity, and methods for deriving irreducible water saturation often rely on effective porosity. Furthermore, empirical models developed for certain formation perform poorly when used in other field. See Mohaghegh, S. et al., "State-Of-The-Art in Permeability Determination From Well Log Data: Part 2—Verifiable, Accurate Permeability Predictions, the Touch-Stone of All Models," SPE 30979, presented at the SPE Eastern Regional Conference & Exhibition, Morgantown, W.Va., Sep. 17–21, 1995.

It is desirable to have methods for providing more accurate formation permeability profiles, which match formation log data obtained from fluid flow measurements. In addition, it is desirable that such methods are generally applicable to various formation permeability models.

SUMMARY OF INVENTION

An aspect of the invention relates to methods for calibrating a formation permeability model with respect to data obtained from fluid flow measurements. A method according to the invention includes determining a correlation coefficient for a porosity-irreducible water saturation relationship; determining a leading coefficient for a formation permeability model; and determining at least one exponent parameter for the formation permeability model by minimizing a basis function that represents a difference between a formation permeability estimate derived from the formation permeability model and a formation permeability estimate derived from the fluid flow measurements.

Other aspects and advantages of the invention will be apparent from the following description and the appended claims.

DETAILED DESCRIPTION

Embodiments of the invention relate to methods for modeling formation permeability. According to one embodiment of the invention, a log permeability model calibration program provides a consistent, accurate, and reliable means of calibrating open hole log permeability model predictions that are in agreement with the values of formation permeability (conductivity). The formation permeability (conductivity) data may be derived from fluid flow measurement analyses, such as well transient test analyses or production performance analyses.

According to other embodiments of the invention, permeability model calibration may also be performed using discrete point measurements of permeability. The discrete point measurements may be obtained from core analyses or from downhole testing using a formation fluid tester, such as a Repeat Formation Tester sold under the trade name of RF™ by Schlumberger Technology Corp. (Houston, Tex.), or a Modular Dynamics Tester sold under the trade name of MDT™ by Schlumberger Technology Corp. (Houston, Tex.).

Some embodiments of the invention relate to log permeability model calibrations that use numerical minimization techniques to determine estimates of the coefficients and exponents of the log permeability models that provide a formation permeability (conductivity) profile, which over specified intervals of the wellbore, agrees with the estimates of reservoir permeability (conductivity) determined from transient test or production performance analyses, or from discrete point measurements of permeability.

According to embodiments of the invention, the log permeability models implemented in the minimization analysis are empirical models that are based on the correlation between permeability (k), porosity (φ), and irreducible water saturation ($S_{wi}$). Examples of such empirical models include that proposed by Coates in 1981, Coates, G. R. and Denoo, S., "*The Producibility Answer Product,*" Schlumberger Technical Review (June 1981) Vol. 29, No. 1, 54–63, and that proposed by Timur, A., "*An Investigation of Permeability, Porosity, and Residual Water Saturation Relationships for Sandstone Reservoirs,*" The Log Analyst (July–August 1968) 9, No. 4.

While the following description uses the Coates and Timur permeability models as examples, one skilled in the art would appreciate that embodiments of the invention may be readily adapted to other formation permeability models. Such other formation permeability models include, for example, the Kozeny model and its modification by Carman, the Archie model, Archie, G. E., "*The Electric Resistivity Log as an Aid in Determining Some Reservoir Characteristics,*" Trans., AIME, 1942, Vol. 146, No. 1, pp. 54–62; the Tixier model, Tixier, M. P., "*Evaluation of Permeability From Electric-Log Resistivity Gradients,*" Oil & Gas Journal, (Jun. 1949), pp. 113; the Wyllie and Rose model, Wyllie, M. R. J., and Rose, W. D., "*Some Theoretical Considerations Related to the Quantitative Evaluation of the Physical Characteristics of Reservoir Rock from Electric Log Data,*" Trans., AIME, vol. 189, pp. 105 (1950); the Sheffield model, see Pirson, S. J., "*Handbook of Well Log Analysis,*" Englewood Cliffs, N. J., Prentice-Hall, Inc., (1963); and the Coates ad Dumanoir model, Coates, G. R., and Dumanoir, J. L., "*New Approach to Improved Log-Derived Permeability,*" The Log Analyst, (January–February 1974), pp. 17.

The general form of the Coates log permeability model is given in Eq. 1.

$$k = \left[\frac{A\phi^D(1-S_{wi})}{S_{wi}}\right]^C \quad (1)$$

where k is permeability in millidarcies, φ is porosity, $S_{wi}$ is irreducible water saturation, A is the leading coefficient, and C and D are the exponents.

Similarly, the general form of the Timur log permeability model is shown in Eq. 2.

$$k = \left[\frac{A\phi^D}{S_{sw}}\right]^C \quad (2)$$

In both models, it is necessary to know the porosity (φ) and the irreducible water saturation ($S_{wi}$) in order to derive the permeability. The irreducible water saturation ($S_{wi}$) of the formation is the lowest water saturation that can be achieved. This parameter is typically measured by displacing the water in a core plug with oil or gas. The irreducible water saturation ($S_{wi}$) is generally not reported in open hole well analyses. Instead, it is derived from other reported formation properties, for example, total and effective porosities and water saturation.

It is well known in the art that the irreducible water saturation ($S_{wi}$) of a given formation correlates with the effective porosity ($\phi_e$) of the same formation. *Schlumberger Log Interpretation Principles/Applications*, Schlumberger Educational Services, Houston (1987). A graph of the computed effective porosity ($\phi_e$) versus the irreducible water saturation ($S_{wi}$) for a given formation tends to exhibit a hyperbolic curve, defined by an empirically determined coefficient (B) that is lithology and formation dependent. This hyperbolic relationship is shown in Eq. 3.

$$S_{wi} = \frac{B}{\phi_e} \quad (3)$$

Figure 1:
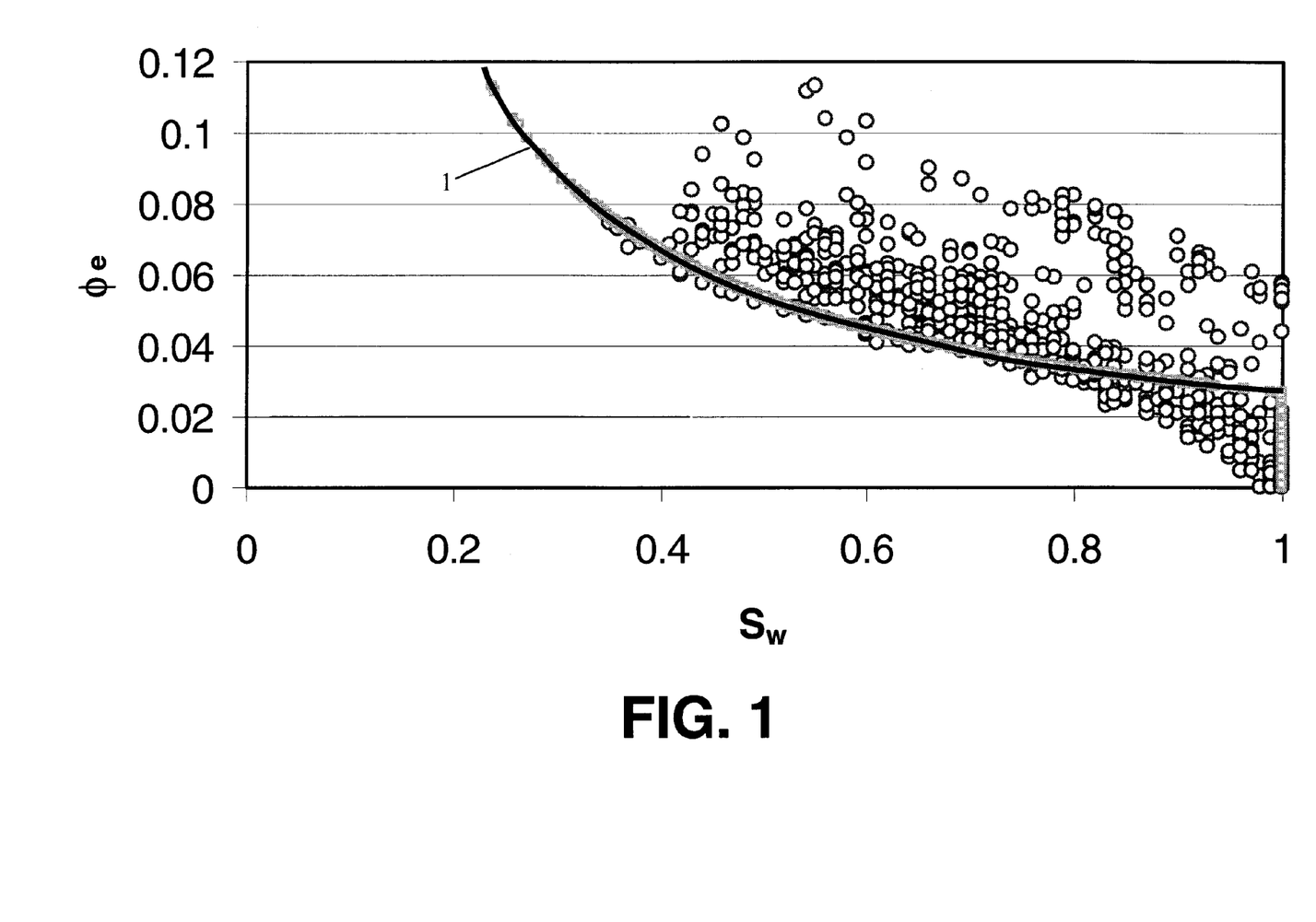
FIG. 1 shows a graph of effective porosity versus water saturation.

An example of the graphical analysis is presented in FIG. 1 for a low permeability, low porosity, shaly sandstone in the U.S. Gulf Coast. FIG. 1 shows a graph of log data for effective porosity ($\phi_e$) as a function of water saturation ($S_w$). The points having the lowest water saturation at each effective porosity ($\phi_e$) lie on a hyperbolic curve 1. Curve 1 represents the irreducible water saturation ($S_{wi}$) as a function of effective porosity (φ). In this particular example, the hyperbolic coefficient B, which depends on the lithology and formation characteristics, is found to be about 0.026.

As shown in FIG. 1, curve 1 can be ascertained only if there are sufficient number of points at the irreducible water saturation. If there are insufficient points at the irreducible water saturation in the graph, it would be difficult to define this curve. In this case, it is more practical to correlate the irreducible water saturation ($S_{wi}$) with total porosity ($\phi_t$), as opposed to effective porosity ($\phi_e$), to solve the relationship between the Bulk Volume Water irreducible (BVWi) and the irreducible water saturation ($S_{wi}$) using a total porosity versus water saturation analysis. This relationship is defined in Eq. 4.

$$S_{wi} = \frac{BVWi}{\phi_t} \quad (4)$$

Embodiments of the invention may use either analysis (i.e., Eq. 3 or Eq. 4) to estimate the irreducible water saturation ($S_{wi}$). Substituting the irreducible water saturation-effective porosity relationship (Eq. 3) into the Coates log permeability model of Eq. 1 gives:

$$k = \left[\frac{A\phi^D(\phi_e - B)}{B}\right]^C \quad (5)$$

The first porosity term (φ) on the right hand side of Eq. 5 is generally modeled using effective porosity ($\phi_e$) because the permeability of a formation is generally considered to be more directly correlated with the effective porosity ($\phi_e$) of the formation, rather than the total porosity ($\phi_t$) that includes the clay component of the formation. In embodiments of the invention, the second porosity term on the right hand side of Eq. 5 may be determined directly from the irreducible water saturation-porosity relationship specified, either effective or total porosity, depending on which porosity-irreducible water saturation relationship is used in the analysis (Eq. 3 or 4). Therefore, the general form of the Coates log permeability model where the effective porosity ($\phi_e$) is used to estimate the irreducible water saturation is given by Eq. 6. The corresponding relationship that uses the total porosity—Bulk Volume Water irreducible relationship is given by Eq. 7

$$k = \left[\frac{A\phi_e^D(\phi_e - B)}{B}\right]^C \quad (6)$$

$$k = \left[\frac{A\phi_e^D(\phi_t - BVWi)}{BVWi}\right]^C \quad (7)$$

Similarly, the Timur log permeability model may be obtained by substituting the relationship for the irreducible water saturation correlation (Eq. 3 or 4) into Eq. 2. The Timur log permeability model, expressed in terms of the effective porosity-irreducible water saturation correlation (Eq. 3), is given in Eq. 8. The corresponding Timur permeability model that utilizes the Bulk Volume Water irreducible relationship (Eq. 4) is presented in Eq. 9.

$$k = \left[\frac{A\phi_e^{D+1}}{B}\right]^C \quad (8)$$

$$k = \left[\frac{A\phi_e^D \phi_t}{BVWi}\right]^C \quad (9)$$

Typical values for exponents C and D are approximately 2. The coefficients A and B are, however, formation dependent and can vary significantly. Most publications suggest a value of A that is approximately equal to 100. See *Schlumberger Log Interpretation Principles/Applications*, Schlumberger Educational Services, Houston (1987). However, in the course of developing, testing, and implementing embodiments of the present invention, the inventors have found that there is no typical value for this coefficient. For example, in low-permeability, low-porosity, shaly sandstones of the U.S. Gulf Coast the coefficient A has been found to be as low as 1. Because this coefficient has the most impact on the minimization process in permeability modeling, it is better to derive this coefficient from actual well log data, as discussed in more detail below, rather than to assume a value.

A reliable and accurate way to determine the value of the B coefficient using actual log data is by making a graphical analysis of the computed effective porosity versus the water saturation for the formations in question, as shown in FIG. 1. As noted above, this analysis assumes that at least one point in the interval used in the analysis is at the irreducible water saturation. The equivalent Bulk Volume Water irreducible analysis obtained by graphing the total porosity versus the water saturation is however preferred when none of the intervals are actually at the irreducible water saturation.

In embodiments of the invention, these graphical analyses are performed mathematically in the log permeability calibration model prior to minimization of the remaining variable coefficients and exponents in the problem. If intervals of the formation are at irreducible water saturation, these points will fall along a hyperbolic curve that is described by Eq. 3. A similar hyperbolic relationship is also observed for the Bulk Volume Water irreducible function analysis.

The mathematical solution for the coefficient B (or BVWi) from these graphical analyses may be performed by partitioning the data of the graph into a selected number of contiguous bins of water saturation. The bins are then searched to determine the corresponding minimum effective porosity (or total porosity) in each bin. The water saturation-porosity data pairs are bubble sorted in an ascending order with respect to water saturation in this analysis. Thus, beginning at a minimum water saturation value, each successive bin searched must have a correspondingly lower porosity value than the previous valid bin. If a given bin has a higher minimum porosity value than a previous bin, it is definitely not on the irreducible water saturation curve and is not included in the determination of the irreducible water saturation-porosity relationship. Using a sufficiently large number of the water saturation bins, the points identified in this analysis would closely approximate a continuous and smoothly varying irreducible water saturation curve, e.g., curve 1 in FIG. 1.

The above described is only one example of finding data points that lie along the hyperbolic correlation curves. One skilled in the art would appreciate that other methods may also be used without departing from the scope of the invention. For example, one may bubble sort the data points in a descending order with respect to water saturation. Similarly, one may bin the data points with respect to effective porosity instead of water saturation.

In one embodiment, once the valid bin data points are obtained, a global sweep of all of the effective porosity-water saturation data pairs is made to determine the absolute minimum value of the coefficient B. This minimization process may be initiated by first assigning an initial estimate of this coefficient to the product of the appropriate porosity and water saturation of the lowest water saturation bin. The computation of B (or BVWi) in this manner follows directly from Eqs. 3 and 4. This minimization procedure is repeated for all of the valid water saturation bin values. The minimum porosity-water saturation product obtained in this manner is the best estimate of B (or BVWi) that can be derived directly from the open hole well log analysis data.

Again, the global sweep approach to finding the global minimum for coefficient B (or BVWi) described above is only for illustration. Other approaches may include, for example, fitting the valid data points to either Eq. 3 or Eq. 4. These other approaches are expressly within the scope of the invention.

The values of the coefficient B (or BVWi) can vary considerably, depending on the formation lithology and intrinsic properties (e.g., grain sizes). In some low-permeability, low-porosity shaly sandstones of the U.S. Gulf Coast, values for B have been found to range from about 0.01 to 0.06 in the same formation over an interval of about 1800 feet. Other published sources indicate carbonate formations may have B coefficient values an order of magnitude or more higher than the values found in the shaly sandstone examples discussed. See *Schlumberger Log Interpretation Principles/Applications*, Schlumberger Educational Services, Houston (1987).

Once the estimate of the coefficient B (or BVWi) has been obtained from the porosity-water saturation graphical analysis, minimization of the other variables of the problem can proceed. One caveat, however, regarding the use of the Coates log permeability model given by Eqs. 6 or 7 in a numerical minimization procedure, is that the porosity value (either effective or total, whichever is used) must be greater than or equal to the B (or BVWi) coefficient value in order for the log permeability model to be applicable. Otherwise, an illegal exponentiation occurs. Therefore, the Coates log permeability model implemented in the embodiments of the invention uses a Heaviside unit step function, as given by a general form in Eq. 10.

$$k = \left[\frac{-A\phi_e^D U(B-\phi)(B-\phi)}{B}\right]^C \quad (10)$$

The Heaviside unit step function has the properties defined by Eq. 11.

$$U(B-\phi)(B-\phi) = \begin{cases} 0, & \phi \leq B \\ (B-\phi), & \phi > B \end{cases} \quad (11)$$

The partial derivative of the product of the unit step function and the difference between the B coefficient and the porosity with respect to the B coefficient is given by Eq. 12.

$$\frac{\partial}{\partial B}[U(B-\phi)(B-\phi)] = \begin{cases} \frac{\partial(B-\phi)}{\partial B} = 1, & B < \phi \\ 0, & B \geq \phi \end{cases} \quad (12)$$

The Timur log permeability model, on the other hand, does not have this problem. However, it can be seen in both log permeability models that probably the most significant parameter (in terms of its effect on the function being minimized) is the leading coefficient A. A numerical minimization procedure that relies on derivatives to locate the minimum of the function will never be able to accurately determine this coefficient because it is a constant. Differentiation of the minimization function with respect to A and equating the result to zero (to locate the extrema of the function), eliminates the coefficient from the function minimization analysis. Therefore, the next step in the minimization process is to evaluate coefficient A using a numerical minimization procedure that does not rely on derivatives, such as the Downhill Simplex method or simple Gaussian minimization of the function.

Minimization Procedures
Minimization to Individual Interval-Specified Average Formation Conductivities If multiple sample points are available over the distribution of the formation, such as the case of using laboratory permeability measurements of radial sidewall cores obtained over the formation interval, or from station flow measurements using the RFT™ or MDT™ tools, to calibrate the coefficients and exponents of a specified log permeability model based on the multiple sample points is a simple non-linear minimization problem, which can readily be resolved using any one of a number of numerical techniques.

In contrast, the minimization problem for the calibration of the model to a representative average permeability (conductivity) value for a specified interval of the formation can not be resolved in such a simple manner. An analysis procedure that can use an average formation permeability (conductivity) estimate from fluid flow measurements, such as the average formation permeability (conductivity) from a pressure transient test or a production performance analysis, to calibrate the coefficients and exponents of a specified log permeability model, requires relatively sophisticated numerical minimization procedures. Generally, a combination of several methods is required in order to reliably solve the minimization problem.

The problem associated with this type of minimization results from the requirement that a summation of the discrete conductivities of the formation must equal the average formation conductivity of the fluid flow measurement. The minimization must produce a computed formation log permeability (conductivity) profile that corresponds to a single data point, the average conductivity of the formation derived from fluid flow measurements.

Available information for the minimization includes open hole log analysis results (porosity and water saturation), an empirical log permeability model, and independent estimates of the average formation conductivity at given intervals of the well. Assuming that the reservoir is infinite-acting, that all layers of the formation are open to production at the well bore (whether directly with the well bore or by communication in the reservoir via a high conductivity conduit such as a hydraulic fracture), and that cross flow does not occur between the layers in the reservoir except for commingling in the well bore or fracture, the average formation conductivity is related to the individual interval formation conductivities as described in Eq. 13.

$$\overline{kh} = \sum_{j=1}^{n} k_j h_j \quad (13)$$

The best estimates of the log permeability model parameters are obtained when the relationship given in Eq. 13 is satisfied. When the summation of the computed conductivities are either higher or lower than the reference average formation conductivity, the computed formation conductivity profile deviates from the point where the best estimates lie. Therefore, the basis function used in this minimization can be stated mathematically as:

$$0 = \left| \overline{kh} - \sum_{j=1}^{n} k_j h_j \right| \quad (14)$$

Figure 2:
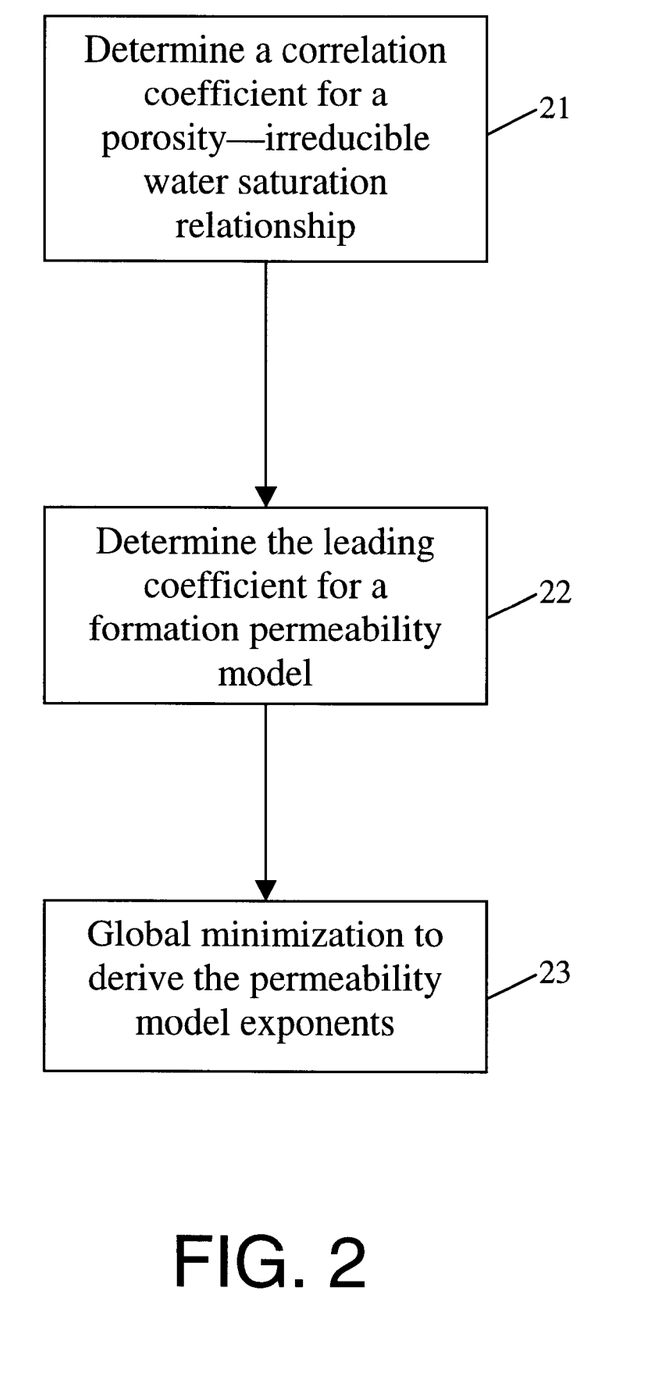
FIG. 2 shows a flow chart of a method for fitting log formation permeability model using fluid flow measurements according to one embodiment of the invention.

As noted above, a general minimization procedure that is used in this type of analysis involves several discrete steps to determine the best set of parameter estimates for the log permeability model. FIG. 2 shows a flow chart of these steps according to one embodiment of the invention. The first step 21 is to determine a correlation coefficient for a porosity-irreducible water saturation relationship, e.g., the B (or BVWi) coefficient. This may be accomplished using a porosity-irreducible water saturation graphical analysis, as described above. The second step 22 is to determine an initial estimate of the leading coefficient A for a formation permeability model using a Gaussian minimization, followed by determining a value of A that minimizes the basis function while other parameters are held constant. Next a global minimization (step 23) is performed for the permeability model exponents C and D, using any of the global minimization techniques known in the art. Examples of the global minimization techniques include a modern variable metric numerical minimization procedure for multi-dimensional analysis, such as that disclosed by Broyden et al, Dennis, J. E. and Schnabel, R. B., "*Numerical Methods for Unconstrained Optimization and Nonlinear Equations,*" Prentice-Hall, Englewood Cliffs, N.J., 1983, or conjugate gradient techniques, and less sophisticated methods such as the Downhill Simplex method of Nelder and Mead, Nelder, J. A. and Mead, R., Computer Journal, Vol. 7, 308–313.

If the Downhill Simplex minimization technique is used, the estimate of the leading coefficient A can also be refined in this global minimization step because this technique uses only function evaluations and does not rely on derivative evaluations in the minimization procedure.

With the Broyden et al minimization technique, partial derivatives of the basis function with respect to each variable are required. It is more accurate, less computationally expensive, and generally preferred to derive those relationships analytically when implementing a minimization technique of this type. Therefore, the partial derivatives of the basis function (Eq. 14) with respect to the coefficients A and B and the exponents C and D using the Coates log permeability model are given in Eqs. 15–18, respectively. Note that the same general form of these relationships applies, whether the irreducible water saturation-porosity relationship is obtained using the effective or total porosities (B or BVWi).

$$\frac{\partial f}{\partial A} = -\frac{C}{A}\text{sgn}\left[\overline{kh} - \sum_{j=1}^{n}\left(\frac{A\phi_{ej}^{D}U(B-\phi_j)(\phi_i-B)}{B}\right)^C h_j\right] \quad (15)$$

$$\sum_{j=1}^{n}\left(\frac{A\phi_{ej}^{D}U(B-\phi_j)(\phi_j-B)}{B}\right)^C h_j$$

$$\frac{\partial f}{\partial B} = \frac{AC}{B}\text{sgn}\left[\overline{kh} - \sum_{j=1}^{n}\left(\frac{A\phi_{ej}^{D}U(B-\phi_j)(\phi_j-B)}{B}\right)^C h_j\right]. \quad (16)$$

$$\sum_{j=1}^{n}\left(\frac{A\phi_{ej}^{D}U(B-\phi_j)(\phi_j-B)}{B}\right)^C (\phi_{ej}^{D})\left(1 + \frac{U(B-\phi_j)(\phi_j-B)}{B}\right) h_j$$

$$\frac{\partial f}{\partial C} = -\text{sgn}\left[\overline{kh} - \sum_{j=1}^{n}\left(\frac{A\phi_{ej}^{D}U(B-\phi_j)(\phi_j-B)}{B}\right)^C h_j\right]. \quad (17)$$

$$\sum_{j=1}^{n}\ln\left(\frac{A\phi_{ej}^{D}U(B-\phi_j)(\phi_j-B)}{B}\right)\left(\frac{A\phi_{ej}^{D}U(B-\phi_j)(\phi_j-B)}{B}\right)^C h_j$$

$$\frac{\partial f}{\partial D} = -C\text{sgn}\left[\overline{kh} - \sum_{j=1}^{n}\left(\frac{A\phi_{ej}^{D}U(B-\phi_j)(\phi_j-B)}{B}\right)^C h_j\right]. \quad (18)$$

$$\sum_{j=1}^{n}\left(\frac{A\phi_{ej}^{D}U(B-\phi_j)(\phi_j-B)}{B}\right)^C \ln(\phi_{ej}) h_j$$

Similarly, the partial derivatives of the basis function when the Timur log permeability model is used are defined in Eqs. 19–22.

$$\frac{\partial f}{\partial A} = -\frac{C}{A}\text{sgn}\left[\overline{kh} - \sum_{j=1}^{n}\left(\frac{A\phi_{ej}^{D}\phi_j}{B}\right)^C h_j\right]\sum_{j=1}^{n}\left(\frac{A\phi_{ej}^{D}\phi_j}{B}\right)^C h_j \quad (19)$$

$$\frac{\partial f}{\partial B} = \frac{C}{B}\text{sgn}\left[\overline{kh} - \sum_{j=1}^{n}\left(\frac{A\phi_{ej}^{D}\phi_j}{B}\right)^C h_j\right]\sum_{j=1}^{n}\left(\frac{A\phi_{ej}^{D}\phi_j}{B}\right)^C h_j \quad (20)$$

$$\frac{\partial f}{\partial C} = -\text{sgn}\left[\overline{kh} - \sum_{j=1}^{n}\left(\frac{A\phi_{ej}^{D}\phi_j}{B}\right)^C h_j\right]\sum_{j=1}^{n}\left(\frac{A\phi_{ej}^{D}\phi_j}{B}\right)^C \ln\left(\frac{A\phi_{ej}^{D}\phi_j}{B}\right) h_j \quad (21)$$

$$\frac{\partial f}{\partial D} = -C\text{sgn}\left[\overline{kh} - \sum_{j=1}^{n}\left(\frac{A\phi_{ej}^{D}\phi_j}{B}\right)^C h_j\right]\sum_{j=1}^{n}\left(\frac{A\phi_{ej}^{D}\phi_j}{B}\right)^C \ln(\phi_{ej}) h_j \quad (22)$$

The signum function in Eqs. 15–22 has the properties defined in Eq. 23.

$$\text{sgn}(g(x)) = \begin{cases} -1, & g(x) < 0 \\ 0, & g(x) = 0 \\ 1, & g(x) > 0 \end{cases} \quad (23)$$

Minimization for a Single set of log Permeability Model Parameter Values Using Conductivity Estimates of Individual Zones in an Interval of Interest It is often desirable that the log permeability model be calibrated, using a set of individually-defined formation conductivity values for each of the completed zones within the interval of interest, so that it results in a single set of coefficients and exponents that are applicable and representative of a given formation or wellbore interval. The minimization basis function in this case is defined in Eq. 24.

$$0 = \sum_{i=1}^{N}\left|\overline{kh_i} - \sum_{j=1}^{n_i}k_j h_j\right| \quad (24)$$

The Broyden et al numerical minimization technique has been found to provide a better match between the log permeability model (and coefficients) and the specified formation permeability (or conductivity) values than the Downhill Simplex method of Nelder and Mead for all of the minimization cases tested. This result is expected because the Broyden et al method has a higher order convergence than the Downhill Simplex method does.

The partial derivatives of the minimization basis function for the Coates log permeability model that are used in embodiments of the invention are given in Eqs. 25–28. These relationships are presented in a general form, with the porosity ($\phi$ or BVWi) and irreducible water saturation ($S_{wi}$) relationship determining the exact form of the required relationships.

$$\frac{\partial f}{\partial A} = -\frac{C}{A}\sum_{i=1}^{N}\left\{\text{sgn}\left[\overline{kh_i} - \sum_{j=1}^{n_i}\left(\frac{A\phi_{ej}^{D}U(B-\phi_j)(\phi_j-B)}{B}\right)^C h_j\right]\right. \quad (25)$$

$$\left.\sum_{j=1}^{n_i}\left(\frac{A\phi_{ej}^{D}U(B-\phi_j)(\phi_j-B)}{B}\right)^C h_j\right\}$$

$$\frac{\partial f}{\partial B} = \frac{AC}{B}\sum_{i=1}^{N}\left\{\text{sgn}\left[\overline{kh_i} - \sum_{j=1}^{n_i}\left(\frac{A\phi_{ej}^{D}U(B-\phi_j)(\phi_i-B)}{B}\right)^C h_j\right].\right. \quad (26)$$

$$\sum_{j=1}^{n_i}\left(\frac{A\phi_{ej}^{D}U(B-\phi_j)(\phi_j-B)}{B}\right)^C$$

$$\left.(\phi_{ej}^{D})\left(1 + \frac{U(B-\phi_j)(\phi_j-B)}{B}\right) h_j\right\}$$

$$\frac{\partial f}{\partial C} = -\sum_{i=1}^{N}\left\{\text{sgn}\left[\overline{kh_i} - \sum_{j=1}^{n_i}\left(\frac{A\phi_{ej}^{D}U(B-\phi_j)(\phi_j-B)}{B}\right)^C h_j\right].\right. \quad (27)$$

$$\sum_{j=1}^{n}\ln\left(\frac{A\phi_{ej}^{D}U(B-\phi_j)(\phi_j-B)}{B}\right)$$

$$\left.\left(\frac{A\phi_{ej}^{D}U(B-\phi_j)(\phi_j-B)}{B}\right)^C h_j\right\}$$

$$\frac{\partial f}{\partial D} = -C\sum_{i=1}^{N}\left\{\text{sgn}\left[\overline{kh_i} - \sum_{j=1}^{n_i}\left(\frac{A\phi_{ej}^{D}U(B-\phi_j)(\phi_j-B)}{B}\right)^C h_j\right].\right. \quad (28)$$

$$\left.\sum_{j=1}^{n_i}\left(\frac{A\phi_{ej}^{D}U(B-\phi_j)(\phi_j-B)}{B}\right)^C \ln(\phi_{ej}) h_j\right\}$$

Similarly, the partial derivatives of the basis function when the Timur log permeability model is used in the analysis are defined in Eqs. 29–32.

$$\frac{\partial f}{\partial A} = -\frac{C}{A}\sum_{i=1}^{N}\left\{\operatorname{sgn}\left[\overline{kh}_i - \sum_{j=1}^{n_i}\left(\frac{A\phi_{ej}^D\phi_j}{B}\right)^C h_j\right]\sum_{j=1}^{n_i}\left(\frac{A\phi_{ej}^D\phi_j}{B}\right)^C h_j\right\} \quad (29)$$

$$\frac{\partial f}{\partial B} = \frac{C}{B}\sum_{i=1}^{N}\left\{\operatorname{sgn}\left[\overline{kh}_i - \sum_{j=1}^{n_i}\left(\frac{A\phi_{ej}^D\phi_j}{B}\right)^C h_j\right]\sum_{j=1}^{n_i}\left(\frac{A\phi_{ej}^D\phi_j}{B}\right)^C h_j\right\} \quad (30)$$

$$\frac{\partial f}{\partial C} = \quad (31)$$

$$-\sum_{i=1}^{N}\left\{\operatorname{sgn}\left[\overline{kh}_i - \sum_{j=1}^{n_i}\left(\frac{A\phi_{ej}^D\phi_j}{B}\right)^C h_j\right]\sum_{j=1}^{n_i}\left(\frac{A\phi_{ej}^D\phi_j}{B}\right)^C \ln\left(\frac{A\phi_{ej}^D\phi_j}{B}\right)h_j\right\}$$

$$\frac{\partial f}{\partial D} = \quad (32)$$

$$-C\sum_{i=1}^{N}\left\{\operatorname{sgn}\left[\overline{kh}_i - \sum_{j=1}^{n_i}\left(\frac{A\phi_{ej}^D\phi_j}{B}\right)^C h_j\right]\sum_{j=1}^{n_i}\left(\frac{A\phi_{ej}^D\phi_j}{B}\right)^C \ln(\phi_{ej})h_j\right\}$$

Minimization Using a Set of Discrete Permeability Points

Embodiments of the invention may also be used to calibrate formation log permeability with respect to a set of discrete permeability data points, as oppose to a single averaged permeability estimate. The set of discrete permeability estimates may be obtained at specific points in the wellbore using a formation fluid tester such as MD™ or RFT™, or from core permeability measurements. For a minimization process of this type, the minimization basis function using the Coates log permeability formula takes the general form given in Eq. 33. The corresponding minimization basis function when the Timur log permeability model is used is given in Eq. 34.

$$0 = \sum_{j=1}^{N}\left|k_i - \left(\frac{A\phi_{ej}^D(f_j - B)}{B}\right)^C\right| \quad (33)$$

$$0 = \sum_{j=1}^{N}\left|k_i - \left(\frac{A\phi_{ej}^D\phi_j}{B}\right)^C\right| \quad (34)$$

The partial derivatives of the minimization basis function using the Coates log permeability model that are used in the numerical minimization procedure are given in Eqs. 35–38.

$$\frac{\partial f}{\partial A} = -\frac{C}{A}\sum_{j=1}^{N}\left\{\operatorname{sgn}\left[k_j - \left(\frac{A\phi_{ej}^D U(B-\phi_j)(\phi_j - B)}{B}\right)^C\right]\right. \quad (35)$$

$$\left.\left(\frac{A\phi_{ej}^D U(B-\phi_j)(\phi_j - B)}{B}\right)^C\right\}$$

$$\frac{\partial f}{\partial B} = \frac{AC}{B}\sum_{j=1}^{N}\left\{\operatorname{sgn}\left[k_j - \left(\frac{A\phi_{ej}^D U(B-\phi_j)(\phi_j - B)}{B}\right)^C\right]\right. \quad (36)$$

$$\left(\frac{A\phi_{ej}^D U(B-\phi_j)(\phi_j - B)}{B}\right)^{C-1}$$

$$\left.(\phi_{ej}^D)\left(1 + \frac{U(B-\phi_j)(\phi_j - B)}{B}\right)\right\}$$

-continued $$\frac{\partial f}{\partial C} = -\sum_{j=1}^{N}\left\{\operatorname{sgn}\left[k_j - \left(\frac{A\phi_{ej}^D U(B-\phi_j)(\phi_j - B)}{B}\right)^C\right]\right. \quad (37)$$

$$\left.\ln\left(\frac{A\phi_{ej}^D U(B-\phi_j)(\phi_j - B)}{B}\right)\left(\frac{A\phi_{ej}^D U(B-\phi_j)(\phi_j - B)}{B}\right)^C\right\}$$

$$\frac{\partial f}{\partial D} = -C\sum_{j=1}^{N}\left\{\operatorname{sgn}\left[k_j - \left(\frac{A\phi_{ej}^D U(B-\phi_j)(\phi_j - B)}{B}\right)^C\right]\right. \quad (38)$$

$$\left.\left(\frac{A\phi_{ej}^D U(B-\phi_j)(\phi_j - B)}{B}\right)^C \ln(\phi_{ej})\right\}$$

Similarly, the partial derivatives of the basis function when the Timur log permeability model is used are defined in Eqs. 39–42.

$$\frac{\partial f}{\partial A} = -\frac{C}{A}\sum_{j=1}^{N}\left\{\operatorname{sgn}\left[k_j - \left(\frac{A\phi_{ej}^D\phi_j}{B}\right)^C\right]\left(\frac{A\phi_{ej}^D\phi_j}{B}\right)^C\right\} \quad (39)$$

$$\frac{\partial f}{\partial B} = \frac{C}{B}\sum_{j=1}^{N}\left\{\operatorname{sgn}\left[k_j - \left(\frac{A\phi_{ej}^D\phi_j}{B}\right)^C\right]\left(\frac{A\phi_{ej}^D\phi_j}{B}\right)^C\right\} \quad (40)$$

$$\frac{\partial f}{\partial C} = -\sum_{j=1}^{N}\left\{\operatorname{sgn}\left[k_j - \left(\frac{A\phi_{ej}^D\phi_j}{B}\right)^C\right]\left(\frac{A\phi_{ej}^D\phi_j}{B}\right)^C \ln\left(\frac{A\phi_{ej}^D\phi_j}{B}\right)\right\} \quad (41)$$

$$\frac{\partial f}{\partial D} = -C\sum_{j=1}^{N}\left\{\operatorname{sgn}\left[k_j - \left(\frac{A\phi_{ej}^D\phi_j}{B}\right)^C\right]\left(\frac{A\phi_{ej}^D\phi_j}{B}\right)^C \ln(\phi_{ej})\right\} \quad (42)$$

Absolute and Effective Permeabilities

Embodiments of the present invention may also be used to evaluate coefficients of log permeability models, whether effective permeability or absolute permeability. Absolute permeability is also known in the art as intrinsic permeability, which is a measure of the ability to transmit or conduct fluids through a rock, conducted when a single fluid, or phase, is present in the rock. Effective permeability is the ability to preferentially conduct or transmit a particular fluid when other immiscible fluids are present in the rock. The relative saturations of the fluids as well as the nature of the rock (or reservoir) affect the effective permeability.

Formation permeability (conductivity) values obtained from fluid flow measurements are representative of effective permeability of the formation. However, in nuclear magnetic resonsance (NMR) imaging log analyses, it is a common practice to report the log derived permeability profiles as absolute permeabilities. Therefore, embodiments of the invention also incorporate an option for minimizing the basis functions to provide coefficients and exponents of the log permeability models as either effective or absolute permeabilities.

When minimization is performed to determine variable values for absolute permeabilities, the empirical relative permeability correlations proposed by Jones and others may be used to relate the effective and absolute permeabilities. See Jones, P. J., "Production Engineering and Reservoir Mechanics (Oil, Condensate, and Natural Gas)," Oil and Gas J. (1945); and Boatman, E. M., "An Experimental Investigation of Some Relative Permeability—Relative Electrical Conductivity Relationships," Master's Thesis, Department of Petroleum Engineering, The University of Texas at Austin, June 1981. The relationships between the effective and absolute permeability are given in Eqs. 43–45 for oil, gas, and water, respectively.

$$k_o = k_a k_{ro} \quad (43)$$

$$k_g = k_a k_{rg} \quad (44)$$

$$k_w = k_a k_{rw} \quad (45)$$

where $k_o$, $k_g$, $k_w$, are absolute permeabilities for oil, gas, and water, respective; $k_{ro}$, $k_{rg}$, $k_{rw}$ are relative (effective) permeabilities for oil, gas, and water, respectively, and $k_a$ is a correlation constant.

The corresponding empirical relative permeability correlations used in the minimization analysis are presented in Eqs. 46–48 for oil, gas, and water, respectively.

$$k_{ro} = \frac{(1-S_w)^{2.1}}{(1-S_{wi})^2} \quad (46)$$

$$k_{rg} = \left[1 - \frac{(S_w - S_{wi})}{(1-S_{wi})}\right]\left[1 - \frac{(S_w - S_{wi})}{[(1-S_{wi})S_w]^{1/4}}\right]^{1/2} \quad (47)$$

$$k_{rw} = \left[\frac{S_w - S_{wi}}{1-S_{wi}}\right]^3 \quad (48)$$

where $S_w$, and $S_{wi}$ are water saturation and irreducible water saturation, respectively; and $k_{ro}$, $k_{rg}$, $k_{rw}$ are relative (effective) permeabilities for oil, gas, and water, respectively.

When the minimization procedures are used to evaluate coefficients and exponents of an absolute permeability model, the effective permeabilities to the hydrocarbon phase in the reservoir that appear in the applicable minimization basis function is obtained with Eqs. 46 and 47 for oil and gas reservoir analyses, respectively. The corresponding water effective permeability is also evaluated (with Eq. 48) using the results of the absolute permeability and the hydrocarbon and water relative permeability relationships.

Computational Considerations

Embodiments of the invention include several options for determining best estimates of coefficients and exponents of log permeability models to provide results that are in agreement with measured formation permeabilities or conductivities. Besides the previously discussed options for (1) determining the irreducible water saturation-porosity relationships, (2) individual interval or global parameter estimates, and (3) the option to perform calibrations to either absolute or effective permeabilities, the following additional minimization options have been included in embodiments of the invention.

The B (or BVWi) coefficient for each zone of interest can be evaluated using (a) a separate porosity-irreducible water saturation relationship for each interval, (b) a globally-determined average B (or BVWi) coefficient value to be used in the analysis for all intervals, or (c) a globally-determined minimum B (or BVWi) coefficient value to be used in the minimization analysis of all intervals. An additional option is available in the minimization analysis program that permits the specification of an upper limit water saturation threshold cutoff for use in the porosity-water saturation graphical analyses to provide irreducible water saturation ($S_{wi}$) at the intervals of interest. As a practical example, the porosity-water saturation graphical analysis shown in FIG. 1 indicates that the upper limit threshold for the computed water saturation in that analysis should be about 0.8.

Minimization analysis codes according to embodiments of the invention also have options for specifying whether a particular log permeability model parameter (coefficient or exponent) is permitted to vary in the minimization procedure, as well as options for specifying the log depths and computed log-derived permeabilities in either conventional oilfield or SI units. Each of these options makes the minimization analysis software developed more useful and practical for practicing well log analysts, geologists, petrophysicists, and petroleum engineers.

FIELD EXAMPLES

Figure 3:
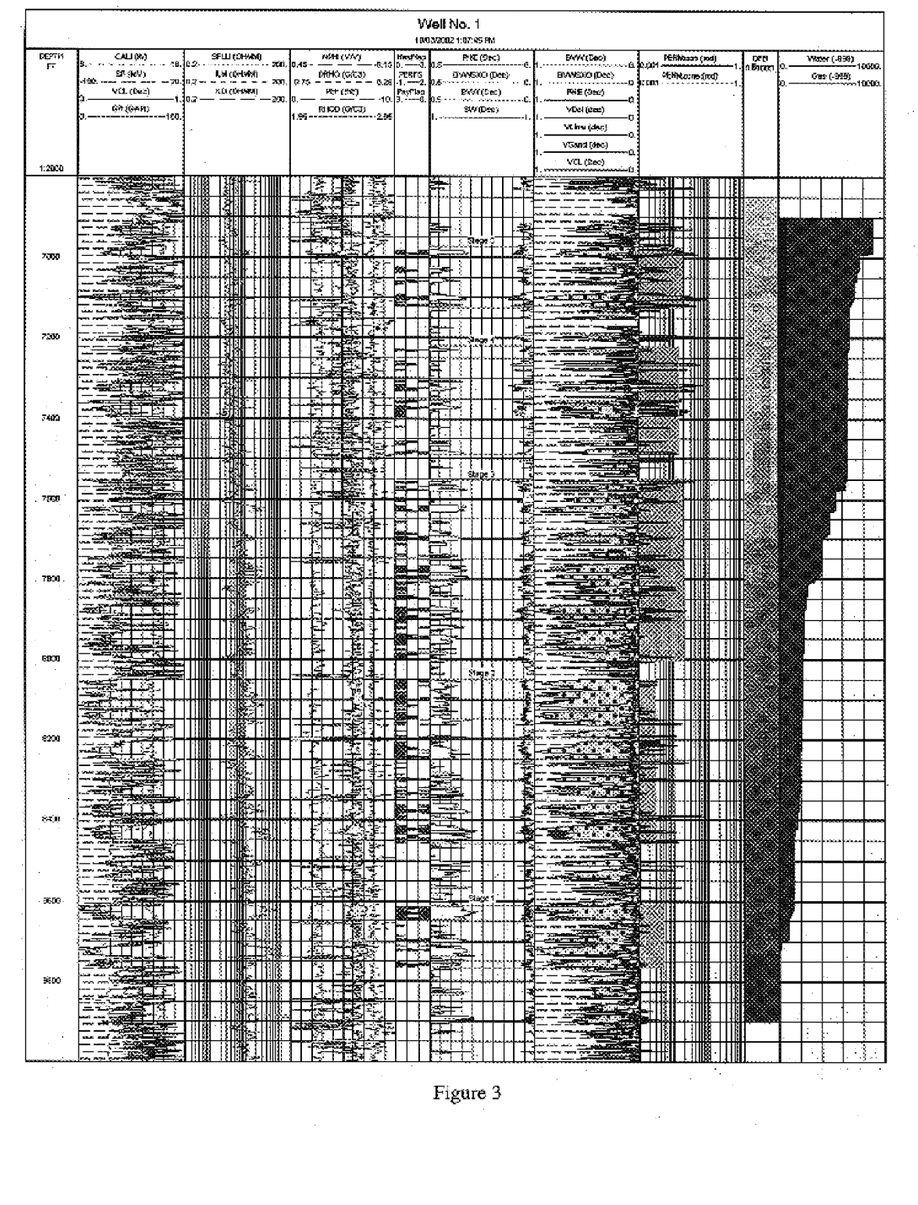
FIG. 3 shows a formation permeability profile computed according to one embodiment of the invention.

FIG. 3 (Well No. 1) shows results obtained with one embodiment of the invention. Production logs were run after all zones were put on production and the results are displayed in the last 2 tracks of the log. Using the production logs and production performance analysis the permeability of the rock associated with each fracture stage was determined and is shown as the shaded area of track 8 on the log (PERMzone). The coefficients for the Coates permeability equation were then calculated.

The inputs for the calculation were the average effective formation permeability to gas for each of the fracture stages (derived from a well production performance analysis), the formation net pay thickness of each fracture stage interval used in the production performance analysis, and the water saturation, total porosity, and effective porosity values determined from the well log analysis. For this example, the B parameter value used in the analysis was the average of all of the zones, and all zones were combined to derive one set of parameter estimates for the other variables in the model (A, C, and D). The B value in this case was computed as the numerical average of the B values computed for each of the individual fracture stages. The resulting model computed permeability profile is displayed in track 8 as PERMcom.

The other curves presented on the log are either the raw data curves or curves resulting from the log analysis. Track 1 is the depth track, track 2 shows the volume of clay along with the gamma ray, Spontaneous Potential (SP) and caliper curves, track 3 has the resistivity measurements, and track 4 displays the neutron porosity, bulk density, density correction and the Photoelectric Effect (PEF) measurements. Track 5 presents a reservoir flag based on cutoffs of volume of clay and porosity (green) and a pay flag based on cutoffs of volume of clay, porosity and water saturation (red). The perforations are indicated in the center of track 5 by the black flag. Track 6 shows the water saturation as a blue curve. The water saturation in this well was derived using a dual water model.

Figure 4:
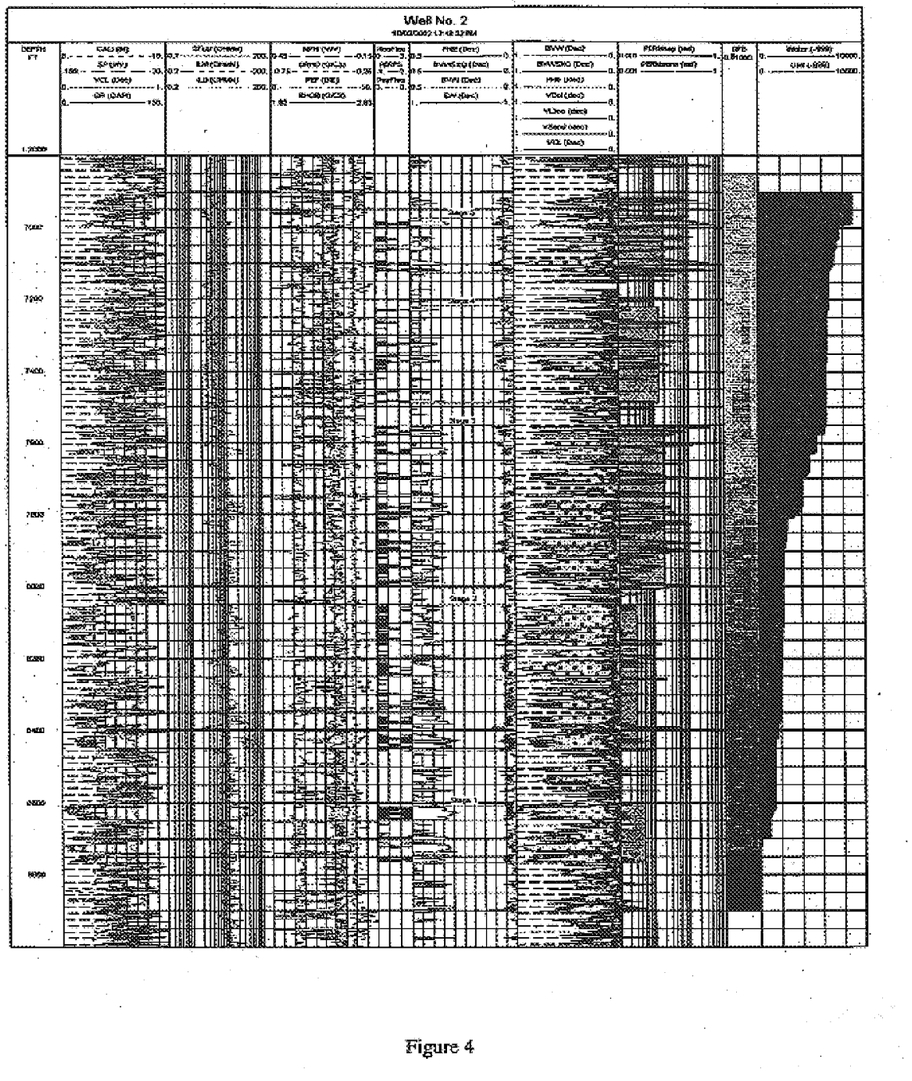
FIG. 4 shows another formation permeability profile computed according to one embodiment of the invention.

FIG. 4 (Well No. 2) show the same well log data as in FIG. 3, with all of the same data displayed. For this example, the B value used was the value calculated in each individual zone (fracture stage interval). The other variables were also calculated individually for each zone. The Coates permeability equation was then used to compute different values of log permeability model parameters in each zone (fracture stage) as well as the resulting formation permeability profile. The resulting permeability profile is displayed on the log in track 8 as PERMsep.

Figure 5:
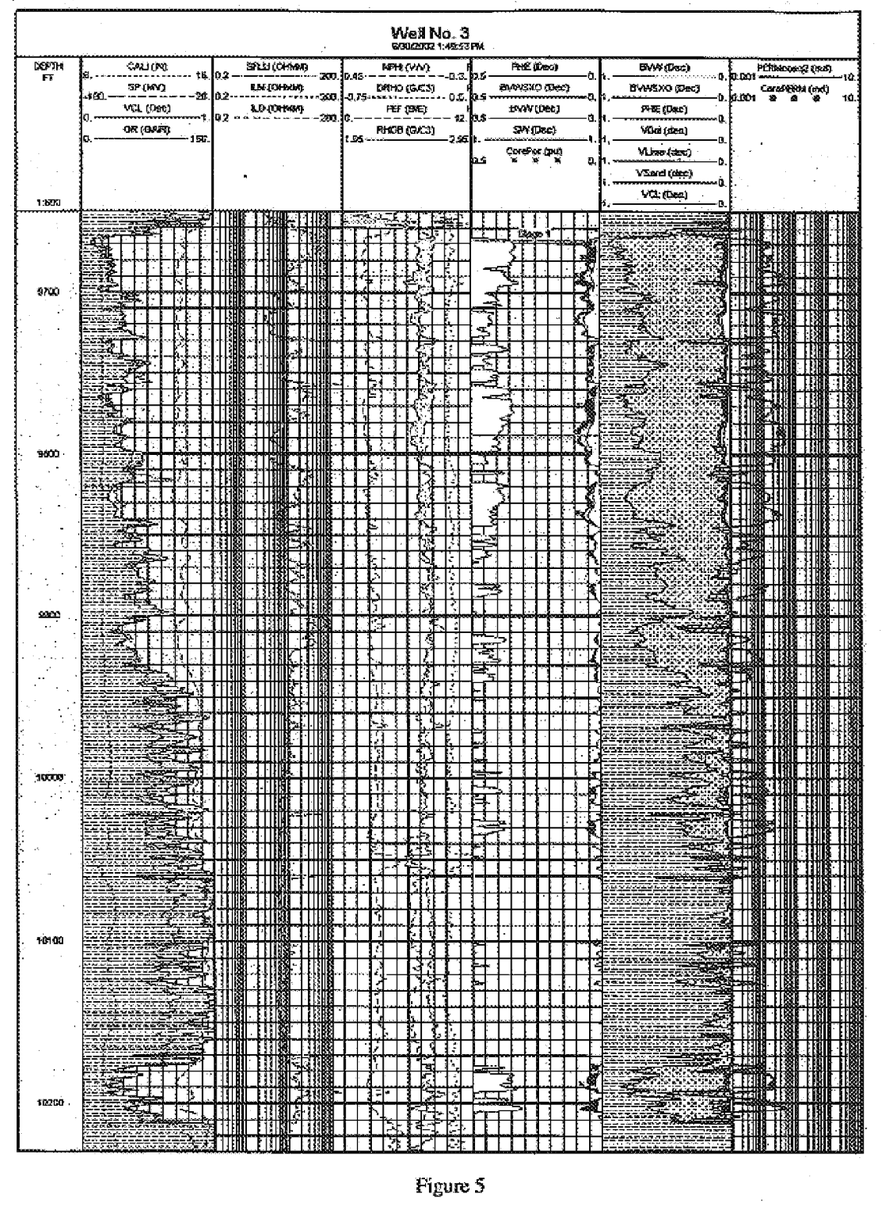
FIG. 5 shows another formation permeability profile computed according to one embodiment of the invention.

FIG. 5 (Well No. 3) shows a well that had several sidewall rotary cores taken. The types of log data presented in this example is the same as shown in the first two examples, with the exception of the track showing the reservoir and pay flags, and the perforations. The permeability equation used is the Coates permeability equation. Since this well had core permeabilities, the option to derive the coefficients based on discrete point measurements was selected. The inputs to the software are the core permeabilities and the corresponding well depths, and the water saturation, total porosity and effective porosity values from the well log analysis. The resulting computed permeability curve is displayed in track 7 of the log as PERMcoeq2. Also in track 7 are the permeabilities from the cores analysis that are identified by the green points on the log. One can clearly see that there is an excellent agreement between the computed log permeability profile and the measured core permeability points.

These field examples demonstrate the ability, robustness, and validity of the numerical minimization techniques according to embodiments of the invention used in the log permeability model calibration analyses. This numerical minimization model has been used to accurately and reliably determine the appropriate log permeability model parameter values for numerous wells. Typical modem well log analysis models currently only permit the log analyst to manually shift the computed log permeability profile to obtain reasonable agreement with measured discrete point permeability values. These discrete point measurement values of formation permeability can typically be obtained from core analyses, or source point tests such as with an MDT™ or RFT™ formation testing tool.

Advantageously, embodiments of the invention provide practical, rigorous, and systematic analysis procedures for obtaining reliable and accurate estimates of parameters for log permeability models. The general minimization methodologies of the invention can be readily extended to other log permeability models known in the art. Embodiments of the invention have been found to be robust and stable, and can be applied to a wide range of formation types, lithologies, and geographical locations. Embodiments of the invention also provide practical, systematic, numerical techniques for properly calibrating log permeability models to obtain reliable agreement with average formation conductivity estimates obtained from pressure-transient test or well production performance analyses. The log permeability model calibration analysis is applicable to all formation lithologies, including sandstones, carbonates, coal, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for calibrating a formation permeability model with respect to data obtained from fluid flow measurements, comprising:

determining a correlation coefficient for a porosity-irreducible water saturation relationship;

determining a leading coefficient for a formation permeability model; and determining at least one exponent parameter for the formation permeability model by minimizing a basis function that represents a difference between a formation permeability estimate derived from the formation permeability model and a formation permeability estimate derived from the fluid flow measurements.

2. The method of claim 1, wherein the determining the correlation coefficient uses a graphical analysis of effective porosity versus water saturation.

3. The method of claim 1, wherein the determining the correlation coefficient uses a graphical analysis of total porosity versus water saturation.

4. The method of claim 1, wherein the determining the correlation coefficient comprises identifying data points having irreducible water saturation.

5. The method of claim 4, wherein the identifying data points having irreducible water saturation, comprises:

partitioning data points on a porosity versus water saturation graph into a selected number of bins based on water saturation;

identifying a candidate data point having a lowest porosity value in each of the selected number of bins;

starting from a bin having a lowest water saturation, collecting the candidate data point, if a porosity value of the candidate data point is lower than a porosity value of the candidate data point in a previous bin having a lower water saturation value; and determining a minimum value for the correlation coefficient from the collected data points.

6. The method of claim 1, wherein the determining the leading coefficient for the formation permeability model comprises:

determining an initial estimate for the leading coefficient using a Gaussian minimization; and determining an optimal value for the leading coefficient.

7. The method of claim 1, wherein the determining the at least one exponent parameter comprises minimizing the basis function using a global minimization technique.

8. The method of claim 7, wherein the global minimization technique is one selected from the group consisting of a conjugate gradient technique, a downhill simplex method, and a variable metric numerical minimization technique.

9. The method of claim 1, wherein the fluid flow measurements comprises one selected from the group consisting of laboratory measurements using a core plug, transient test measurements using a formation fluid tester in a wellbore, and production log data.

10. The method of claim 1, wherein the formation permeability model comprises one selected from Coates log permeability model and Timur log permeability model.

11. The method of claim 1, wherein the porosity is one selected from the group consisting of an effective porosity and a total porosity.

12. The method of claim 1, wherein the determining the at least one exponent parameter is performed with partial derivative functions of the basis function with respect to the correlation coefficient, the leading coefficient, and the at least one exponent parameter.

13. The method of claim 1, wherein the formation permeability estimate derived from the formation permeability model and the formation permeability estimate derived from the fluid flow measurements comprise an absolute permeability.

14. The method of claim 1, wherein the formation permeability estimate derived from the formation permeability model and the formation permeability estimate derived from the fluid flow measurements comprise an effective permeability.

15. The method of claim 1, wherein the formation permeability estimate derived from the fluid flow measurements comprises an average permeability for a selected interval in a wellbore.

16. The method of claim 1, wherein the formation permeability estimate derived from the fluid flow measurements comprises a set of discrete permeability estimates from a plurality of intervals in a wellbore.

* * * * *